United States Patent

Muggli

[11] Patent Number: 5,968,663
[45] Date of Patent: Oct. 19, 1999

[54] STRETCH-FORMABLE LAMINATE

[75] Inventor: Olivier Y. Muggli, Lousville, Ky.

[73] Assignee: Alusuisse Technology & Management Ltd., Switzerland

[21] Appl. No.: 08/959,438

[22] Filed: Oct. 28, 1997

Related U.S. Application Data

[63] Continuation-in-part of application No. 07/989,777, Dec. 14, 1992, which is a continuation of application No. 07/735,085, Jul. 24, 1991, abandoned.

[51] Int. Cl.$^6$ ...................................................... B32B 15/08
[52] U.S. Cl. ...................... 428/461; 428/411.1; 428/457; 428/500; 264/291; 264/292
[58] Field of Search ................... 428/411.1, 457, 428/461, 500, 515, 35.2, 35.3, 35.7, 35.8, 35.9; 264/512, 515, 291, 292; 29/17.1, 17.2, 17.3; 53/170, 172

[56] References Cited

U.S. PATENT DOCUMENTS

| | | | |
|---|---|---|---|
| 3,933,559 | 1/1976 | Watanabe | 156/211 |
| 4,085,244 | 4/1978 | Stillman | 428/192 |
| 4,224,367 | 9/1980 | Scholle | 428/76 |
| 4,807,745 | 2/1989 | Langley et al. | 206/248 |
| 5,221,576 | 6/1993 | Bose et al. | 428/327 |
| 5,589,275 | 12/1996 | Breitler et al. | 428/458 |

FOREIGN PATENT DOCUMENTS 404147815 5/1992 Japan .

*Primary Examiner*—Paul Thibodeau
*Assistant Examiner*—Sheeba Ahmed
*Attorney, Agent, or Firm*—Bachman & LaPointe, P.C.

[57] ABSTRACT

Stretch-formable metal-plastic composite laminate, for example for the production of containers, the laminate having a metal layer and a plastic layer on both sides of the metal layer, the metal layer having a thickness x and the plastic layers each having a thickness of 0.7 x to 1.4 x, and x being a thickness of 30 to 70 μm, and the plastic layers containing thermoplastics based on olefin, for example polypropylene, or consisting of them.

15 Claims, No Drawings

STRETCH-FORMABLE LAMINATE

CROSS-REFERENCE TO RELATED APPLICATIONS

This application is a Continuation-In-Part of U.S. patent application Ser. No. 07/989,777, filed Dec. 14, 1992, which in turn is a continuation of U.S. patent application Ser. No. 07/735,085, filed Jul. 24, 1991, now abandoned.

BACKGROUND OF THE INVENTION

The invention relates to a stretch-formable metal-plastic composite laminate, the use of the laminate and container therefrom.

It is known to use stretch-formed aluminum molded packs for pharmaceutical products and foodstuffs, for example as press-through packs, containers, under-seal trays, double molds and the like. They are able to meet to maximum effect the high requirements for the protection of the goods against diffusion of oxygen, steam and light, or escape of, for example fragrances, and to improve the user-friendliness of the pack.

In addition, sterilizability, pasteurizability or suitability for hot-filling often belong to the stated requirements.

The state of the art is to produce stretch-formed containers from laminates which have a central aluminum layer, an outer layer of oriented polyamide and an inner layer of polyvinyl chloride. Today the use of polyvinyl chloride should be limited due to reasons relating to environmental protection. Polyvinyl chloride-free layers or those low in polyvinyl chloride have the advantage that if they are energy-recycled as opposed to material-recycled, they produce no pollutants or only few pollutants on combustion. It is also advantageous for disposal and recycling of laminates of this type if there are as few as possible different types of material.

Composite laminates for packs containing no polyvinyl chloride are known per se.

European Application 0 317 818 describes a packaging laminate for tobacco products which has barrier properties. However, the material is only envisaged. for packing, for example cigarettes and is therefore very thin, that is having a maximum thickness limit of 2.5 mils, corresponding to 63.5 $\mu$m. A material of this type is not suitable for stretch-forming.

U.S. Pat. Nos. 4,085,244 and 4,216,268 describe a laminated packaging film comprising an outer biaxially oriented polyamide film, a flexible metal foil, a biaxially oriented polypropylene and an inner sealing layer for the manufacture of pouches.

This film is less suitable as a stretch-form laminate because of its asymmetric construction with a relatively strong inner sealing layer. Furthermore, recycling is made more difficult by the use of two types of plastic.

German Patentschrift 3 436 412 describes a metal sheet laminated on one side or both sides with a biaxially oriented polyester film which ought to be suitable for drawing tins. To achieve secure bonding of metal to the polyester film, the metal sheet must have a double layer of hydrated chromium oxide. A metal sheet of this type is complex to manufacture and chromium oxide layers are undesirable, for example in foodstuffs packaging, or may be prohibited.

None of these film composites or laminates described hitherto can be combined to give optimum properties required for stretch-forming. This also applies to the properties required for reasons relating to environmental protection, which promote, for example recyclability of laminates or the objects prepared therefrom, such as packages.

A suitable composite laminate must support the stretching of the metal layer during the stretch-forming process, so that surface extensions of 80% and higher may be achieved without damage, such as perforation of the metal layer. Protection of the metal layer with regard to damage by cracks or perforation has greater significance since the metal layer serves primarily as a barrier layer against the diffusion of gases, such as oxygen, steam and light, and against the escape of fragrances and aromatic substances.

SUMMARY OF THE INVENTION

The object of the present invention is to provide a stretch-formable metal-plastic composite laminate which does not have the disadvantages mentioned. The stated aim is achieved in accordance with the invention by means of a stretch-formable laminate, the laminate having a metal layer and a plastic layer on both sides of the metal layer, the metal layer having a thickness x and the plastic layers each having a thickness of 0.7 x to 1.4 x, and x being a thickness of 30 to 70 $\mu$m, and the plastic layers containing thermoplastics based on olefin or consisting of them.

DETAILED DESCRIPTION

The metal layer of the laminate may be, for example iron, steel or copper, a preferred metal layer is aluminum or an aluminum alloy. A metal layer is advantageously aluminum having a purity of 98.6% and higher, preferably 99.2% and higher, and particularly preferably 99.5% and higher. Aluminum alloys, for example of the type AA 8079 or AA 8101, are also advantageous.

A soft-annealed, fine-grain and/or largely texture-free (isotropic) aluminum thin tape, i.e., a continuous metal layer that has no perforations, cuts or discontinuities, in particular having at least 5 and particularly preferably 7 grain layers over the thickness of the tape, is particularly preferred as a metal layer.

The surface of the metal layer and in particular the aluminum layer is preferably homogeneous, without residual greases and having a defined surface. The aluminum surfaces may be treated, for example, with stoving lacquers based on epoxide or phenol, or with conversion layers, such as mixed oxide and/or hydrate layers. Furthermore, the surfaces may be pretreated by means of a corona discharge treatment.

The plastic layers contain a thermoplastic based on olefin or consist of it.

The thermoplastics based on olefin are advantageously a polyethylene, polypropylene, poly-(1-butene), poly-(3-methylbutene), poly-(4-methylpentene) or copolymers thereof.

Preferred examples of thermoplastics based on olefin are polyolefins, such as polyethylene and in particular high density polyethylene (HDPE, density greater than 0.944 g/cm$^3$) moderate density polyethylene (MDPE, density 0.926–0940 g/cm$^3$), linear moderate density polyethylene (LMDPE, density 0.926–0.940 g/cm$^3$), low density polyethylene (LDPE, density 0.910–0.925 g/cm$^3$) and linear low density polyethylene (LLDPE, density 0.916–0.925 g/cm$^3$), and polypropylene, polypropylene being most particularly preferred.

The plastic layers may be oriented and are advantageously uniaxially oriented and preferably biaxially oriented. In particular, the plastic layers may contain uniaxially oriented and preferably biaxially oriented thermoplastics based on olefin or consist of them. Uniaxially oriented or in particular biaxially oriented polypropylene is most particularly preferred.

The flow behavior of the plastic layers in the form of films, and in particular of the biaxially oriented polypropylene films, is advantageously as isotropic as possible.

Preferred plastic layers or films below are those in which the yield behavior shows high strengthening.

High strengthening means that with increasing extension of the film, the tension in the machine direction and in the transverse direction increases.

Films with a yield behavior characterized by a positive strengthening increase, at least in the machine direction or the transverse direction, are also preferred. The positive strengthening increase expresses the quotient of the tension increment over the extension increment and is therefore preferably above a value 0, that is the value is preferably positive.

Particularly suitable plastic layers have a high R value, an R value lying in particular above 1. The R value expresses whether the material yields preferably from the width or from the thickness of the particular film. An R value above 1 denotes that the material yields preferably from the width of the sample.

The preferred films include, for example biaxially oriented polypropylene films having a tensile strength in both directions of more than 150 MPa, preferably more than 200 MPa.

The extension to break of preferred films is, for example above 40% and in particular above 50%.

The tension in the extension region of 5 to 15% in preferred films is advantageously between 40 and 120 MPa and in particular between 50 and 100 MPa.

The thickness x mentioned is the thickness for the metal layer and the thickness x may preferably be 40 to 60 $\mu$m.

The thickness of each of the plastic layers is preferably 0.75 x to 1.35 x and particularly preferably 0.9 x to 1.2 x.

The plastic layers disposed on both sides of the metal layer and in particular the thermoplastics based on olefin may each be provided additionally with a sealable layer on one side or on both sides independently of one another. The sealing layers may be, for example coextruded. Coextrusion is advantageously carried out before the orientation process. The type of sealable layer is not critical and may contain, for example, polyethylene, polypropylene or a polypropylene/polyethylene copolymer, or may consist of them. Other suitable sealing layers are made from, for example, polyvinylidene chloride or acrylates, or contain these materials. The thickness range for the sealing layers is, for example 1 to 10 $\mu$m, and preferably 1 to 5 $\mu$m.

A composite which can be sealed on both sides is obtained both by single-sided and double-sided coextrusion of the plastic layer using, for example, a polypropylene/polyethylene copolymer.

The coextruded layer may be directed, for example, towards the aluminum. This is a preferred example because in this way, improved adhesive properties and adhesive conditions may be imparted to the adhesive.

It is therefore advantageous that the plastic layers contain a thermoplastic based on olefin or consist of it and at least one of the thermoplastics based on olefin or consist of it provided with a sealing layer on at least one side. That is, each layer of thermoplastic based on olefin may be covered with a sealable layer on one side or on both sides independently of other layers.

The surface of the plastic films should advantageously have at least 35 mN/m and preferably at least 38 mN/m surface tension, so that the application of adhesive onto the plastic surface may be carried out in optimum manner.

The surface tensions, and hence also the adhesive properties, may be controlled by corona pretreatment of the plastic films and/or of the aluminum surfaces.

A laminating adhesive is advantageously used to join the plastic films to the aluminum or the plastic films to one another. The laminating adhesive may be applied to the surface to be adhered by lacquer laminating.

Examples of suitable adhesives are vinyl chloride copolymers, vinyl chloride-vinyl acetate copolymers, polymerizable polyesters, vinylpyridine polymers, vinylpyridine polymers in combination with epoxy resins, butadiene-acrylonitrile-methacrylic acid copolymers, phenol resins, rubber derivatives, acrylic resins, acrylic resins with phenol or epoxy resins or acrylate copolymers, or organosilicon compound, such as organosilanes.

The organosilanes are preferred. Examples of these are alkyltrialkoxysilanes having an amino functional group, alkyltrialkoxysilanes having an epoxy functional group, alkyltrialkoxysilanes having an ester functional group, alkyltrialkoxysilanes having an aliphatic functional group, alkyltrialkoxysilanes having a glycidoxy functional group, alkyltrialkoxysilanes having a methacryloxy functional group, and mixtures thereof. Examples of those organosilanes are γ-aminopropyltriethoxysilane and N-β-(aminoethyl)-γ-aminopropyltrimethoxysilane, γ-(3,4-epoxycyclohexyl)-ethyltrimethoxysilane, γ-glycidoxypropyltrimethoxysilane, and γ-methacryloxypropyltrimethoxysilane. These compounds are known per se in the specialist field.

Further suitable adhesion promoters are adhesives, such as for example nitrile rubber-phenol resins, epoxides, acrylonitrile-butadiene rubber, urethane-modified acrylics, polyester co-polyamides, hot-melt polyesters, polyisocyanates cross-linked with hot-melt polyesters, polyisobutylene-modified styrene-butadiene rubbers, polyrurethanes, ethylene-acrylic acid mixed polymers and ethylene-vinyl acetate mixed polymers.

The polyurethanes are particularly preferred. Depending on the type, the adhesives may be used with or without solvents or from aqueous solution.

As a rule the adhesive layer thickness is kept to 1 to 12 $\mu$m and preferably 1.5 to 9 $\mu$m. Instead of the layer thickness, the amount of adhesive, especially between the metal layer and the plastic layers arranged right next to both sides of the metal layer, can be expressed by the amount of laminating adhesive. The amount is, for example 1.0 to 14 g/m$^2$, advantageously 1.5 to 9 g/m$^2$, and preferably 1.5 to 6 g/m$^2$. The amount is given without miscellaneous solvent. The plastic films may be heat-laminated on the aluminum surface or also on the opposite surface.

Typical layer constructions for metal laminates according to the present invention contain, for example:
  a) a central layer of aluminum having a thickness of, for example 30 to 70 $\mu$m, and preferably 40 to 60 $\mu$m, and on both sides of the aluminum layer,
  b) and b$^1$) each a layer of a laminating adhesive having a thickness of 1.5 to 9 $\mu$m,
  c) and c$^1$) each a layer of a polyethylene-polypropylene copolymer having a thickness of, for example 1 to 10 $\mu$m, and preferably 1 to 5 $\mu$m, d) and d¹) each a layer of a biaxially oriented polypropylene film, for example having a thickness of 20 to 90 μm, preferably 35 to 70 μm, and in particular 40 to 50 μm, and e) and e¹) each a layer of a polyethylene-polypropylene copolymer having a thickness of, for example 1 to 10 μm, and preferably 1 to 5 μm.

In other layer constructions according to the present invention, the layers c) and/or c¹) and/or the layers e) and/or e¹) may be omitted. Such advantageous metal laminates then contain, for example only the layer a), the layers b) and b¹) and d) and d¹), or the layer a), the layers b) and b¹), d) and d¹) and the layers e) and e¹), or the layer a), the layers b) and b¹), the layers c) and c¹) and the layers d) and d¹).

Packages produced from the metal-plastic laminates of the invention must be heat-resistant in many cases. For example the package must endure a sterilizing or pasteurizing process, or the package acts simultaneously as a boiling vessel and must withstand the heating and/or fermentation process of the contents. The individual components of the laminate are therefore advantageously heat-resistant both on their own as well as in interdependent composite.

This property applies in particular to the individual plastic films, where applicable coextrudates or laminates, and the adhesives and adhesion promoters used.

The invention also relates to the use of the stretch-formable laminates of the invention for producing stretch-formed containers.

The stretch-formable metal-plastic laminates according to the present invention are particularly suitable for producing stretch-formed containers with a ratio of height to diameter of 1 to 3.7 to 3.2, in particular for a flat container base.

For containers which do not have a round base, diameter has the meaning of the length of the diagonal or the average lengths of the diagonals.

The stretch processes for producing containers from the stretch-formable metal-plastic laminates of the invention are known per se. As a rule, a section of the laminate is placed on a die while cold. The laminate is retained on the edge of the die with the aid of a holding-down device and a stamp is lowered into the die while deforming the laminate i.e., the laminate is stretch formed while cold.

The laminate is stretched since no material can flow from the edge region. As a result, the thickness of the laminate decreases.

The composite construction of the laminate of the invention described has optimum suitability for stretch-forming with controlled mechanical properties which aid the extension of the aluminum layer during the stretch-forming process, so that surface extensions of 80% and higher may be achieved without damaging the metal layer.

Extensions up to 40% and higher may be achieved without damaging the aluminum layer in the uniaxial tension state.

Finally, the stretch-formable metal-plastic laminate according to the present invention can be heat-sterilized in the stretched or non-stretched state, in particular under standard conditions of 121° C. for 30 minutes.

The present invention also includes containers of the stretch-formable laminate of the invention, advantageously with a ratio of height to diameter of 1 to 3.7 to 1 to 3.2, in particular for a flat container base.

The containers produced from the stretch-formable metal-plastic composite of the invention are in turn suitable, for example to store foodstuffs for humans or animals. Other intended uses are, for example containers for pharmaceutical products, such as coated tablets, tablets, powders and the like, and cosmetic products, such as perfumed serviettes, colorants and the like.

EXAMPLE

A polyurethane laminating adhesive having an application weight of 5.5 to 6.5 g/m² is applied to an aluminum thin tape having a thickness of 45 μm and a clean surface without pretreatment.

The laminating adhesive solvent is evaporated in the drying channel and then laminated in the laminating gap under pressure with a biaxially oriented oPP film coextruded on both sides from a polypropylene-polyethylene copolymer and having a thickness of 50 μm, and rolled-up or further processed immediately.

Further processing is carried out in identical manner to the above, only now the other side of the aluminum thin tape is laminated under the same conditions.

The finished product is cured at 40 to 50° for a few days and then tested:

The composite adhesion is approximately 10 N/15 mm strip.

The deforming properties may be outlined as follows:

A break depth of more than 9 mm may be achieved by stretch-forming using a flat stamp of diameter 27 mm and a die of diameter 30 mm.

A break depth of more than 13 mm may be achieved by stretch-forming using a semi-spherical stamp with radius 13.5 mm and a die of diameter 30 mm.

Adequate thermal sealing against an identical sealing layer may be carried out starting at a temperature of 140° C.

Sterilization at a temperature of 121° C. for 30 minutes after deformation and aging for three months at 45° C. did not lead to delamination of the plastic layers.

What is claimed is:

1. A stretch-formed metal-plastic composite laminate which comprises a stretch formed metal plastic composite laminate having a metal tape layer and a plastic layer on both sides of the metal tape layer bonded thereto with the surface of the plastic layers having a surface tension of at least 35 mN/m, wherein the metal tape layer is selected from the group consisting of iron, steel, copper, aluminum and aluminum alloys, the metal layer having a thickness x and the plastic layers each have a thickness of 0.7 x to 1.4 x, wherein x is a thickness of 30 to 70 microns, wherein the plastic layers consist essentially of an olefin thermoplastic polymer, wherein the plastic layers are applied to a metal tape layer, and wherein the laminate is in the stretch formed condition and the metal and plastic layers have undergone surface extension without cracks or perforations in the metal layer during the stretch forming process and have been stretch formed while cold and including a surface extension of at least 80% without damaging the metal layer.

2. The method for preparing a heat resistant, stretch-formed container which comprises: providing a stretch-formable metal-plastic composite laminate which comprises a metal-plastic composite having a metal tape layer and a plastic layer on both sides of the metal tape layer and bonded thereto thereto with the surface of the plastic layers having a surface tension of at least 35 mN/m, wherein the metal tape layer is selected from the group consisting of iron, steel, copper, aluminum and aluminum alloys, the metal layer having a thickness x and the plastic layer each having a thickness of 0.7 x to 1.4 x, wherein x is a thickness of 30 to 70 microns, wherein the plastic layers consist essentially of an olefin thermoplastic polymer; and stretch forming said laminate while cold into a container with a height to diameter ratio of 1 to 3.7 to 1 to 3.2, wherein the plastic layers are applied to a metal tape layer and wherein the metal and plastic layers undergo surface extension without cracks or perforations in the metal layer during said stretch forming process and including a surface extension of at least 80% without damaging the metal layer.

3. A stretch-formed metal-plastic composite laminate which comprises a cold formed metal plastic composite laminate having a metal layer and a plastic layer on both sides of the metal layer bonded thereto with the surface of the plastic layers having a surface tension of at least 35 mN/m, wherein the metal layer is selected from the group consisting of iron, steel, copper, aluminum and aluminum alloys, the metal layer having a thickness x and the plastic layers each have a thickness of 0.7 x to 1.4 x, wherein x is a thickness of 30 to 70 microns, wherein the plastic layers consist essentially of an olefin thermoplastic polymer, wherein the plastic layers have been applied to a continuous metal layer, and wherein the laminate is in the stretch formed condition and the metal and plastic layers have undergone surface extension during the cold forming process and including a surface extension of at least 80% without damaging the metal layer.

4. A laminate according to claim 3 wherein said laminate is stretched formed with a ratio of height to diameter of 1 to 3.7 to 1 to 3.2.

5. A laminate according to claim 3 wherein the plastic layers consist essentially of polypropylene.

6. A laminate according to claim 5 wherein the polypropylene is biaxially oriented.

7. A laminate according to claim 3 wherein at least one of the plastic layers is provided with a sealing layer on at least one side thereof.

8. A laminate according to claim 3 wherein x is a thickness of 40 to 60 microns.

9. A laminate according to claim 3 wherein the thickness of each of the plastic layers is 0.75 x to 1.35 x.

10. A laminate according to claim 9 wherein the thickness of each of the plastic layers is 0.9 to 1.2 x.

11. Laminate according to claim 3 wherein said laminate is in the form of a heat resistant stretch-formed container.

12. Laminate according to claim 7 wherein each plastic layer is provided with a coextruded sealing layer 1 to 10 microns in thickness on at least one side thereof towards the metal layer.

13. Laminate according to claim 3 wherein at least one of the metal and plastic layers is subjected to corona pretreatment.

14. Laminate according to claim 3 including a laminating adhesive to join the metal and plastic layers, wherein the adhesive is 1 to 12 microns thick.

15. The method for preparing a heat resistant, stretch-formed container which comprises: providing a stretch-formable metal-plastic composite laminate which comprises a metal-plastic composite having a metal layer and a plastic layer on both sides of the metal layer and bonded thereto with the surface of the plastic layers having a surface tension of at least 35 mN/m, wherein the metal layer is selected from the group consisting of iron, steel, copper, aluminum and aluminum alloys, the metal layer having a thickness x and the plastic layer each having a thickness of 0.7 x to 1.4 x, wherein x is a thickness of 30 to 70 microns, wherein the plastic layers consist essentially of an olefin thermoplastic polymer; and stretch forming by cold forming said laminate into a container with a height to diameter ratio of 1 to 3.7 to 1 to 3.2, wherein the plastic layers have been applied to a continuous metal layer and wherein the metal and plastic layers have undergone surface extension during said cold forming process and including a surface extension of at least 80% without damaging the metal layer.

* * * * *